Jan. 10, 1939.   R. ANDRIEU   2,143,366
SERRATED WAVE FORM GENERATOR
Filed Nov. 18, 1936

INVENTOR
ROBERT ANDRIEU
BY
ATTORNEY

Patented Jan. 10, 1939

2,143,366

UNITED STATES PATENT OFFICE 2,143,366

SERRATED WAVE FORM GENERATOR

Robert Andrieu, Berlin, Germany, assignor to Telefunken Gesellschaft für Drahtlose Telegraphie m. b. H., Berlin, Germany, a corporation of Germany Application November 18, 1936, Serial No. 111,352
In Germany December 3, 1935

4 Claims. (Cl. 250—36)

My invention relates broadly to apparatus for producing a serrated or saw-tooth form of current or voltage wave and more particularly to an apparatus which is effective to produce these waves even in the absence of receipt of external triggering.

The use of current or voltage waves of a saw-tooth form for energizing deflection apparatus in cathode ray tubes, particularly as applied to the use of such tubes as television transmitters and receivers, is well known in the prior art. The prior art has disclosed an apparatus for producing such a wave whereby a direct current potential is impressed on an electric oscillating circuit for producing the long side of the saw-tooth curve and the oscillation circuit is allowed to execute a free half oscillation for producing the short side.

The prior art further discloses the modification of inductively coupling a special coil with this oscillation circuit for the purpose of impressing a potential induced therein on the control grid of a vacuum tube which effects a cut-off of the direct current potential from the oscillating circuit. This has been disclosed in British Patent No. 400,976.

A further disclosure has been proposed in which the use of a screen grid tube has been suggested which is blocked for the production of the short sides of the wave but is open or conducting to the flow of current during at least a portion of the production of the long side of the wave. (See my copending application S. N. 61,499 filed January 30, 1936.)

These proposals of the prior art have been used in conjunction with the received impulses termed "synchronizing pulses" which were transmitted for the purpose of keeping the cathode ray tube in step with the transmission apparatus and these pulses have been utilized to control the production of the saw-tooth wave. No provision has been made therein for the accurate generation of such a wave in the absence of receipt of these impulses which may, for instance, be caused by such phenomena as "fading" or distortion due to interfering electrical signals, etc.

This invention therefore concerns an arrangement of the same general nature, as that disclosed in my copending application referred to above, and improves upon that arrangement in the manner that the saw-tooth generator will accurately produce the proper wave for energizing deflection apparatus even in the absence of receipt of the synchronizing impulses. This property is not inherent in the circuit arrangements known in the prior art nor in my copending application.

The invention will best be understood by reference to the drawing in which:—

Figure 1:
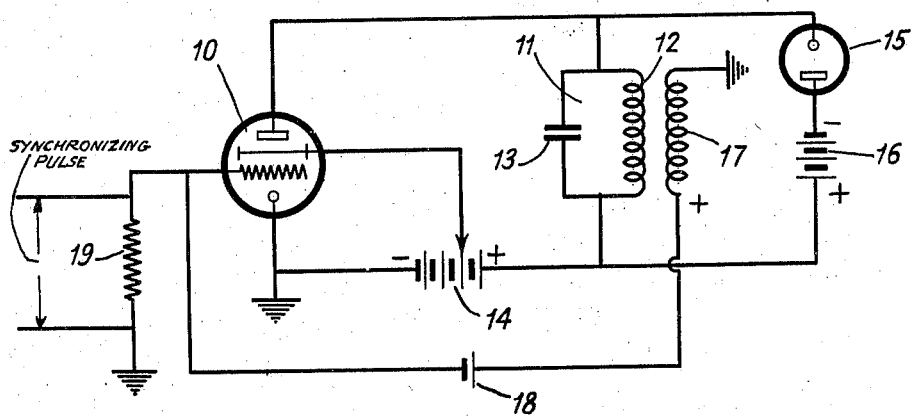
Figure 1 shows one embodiment of my invention.

Referring to Fig. 1, a screen grid tube 10 has joined to its anode-cathode circuit, an oscillating circuit 11 comprising a coil 12 and a condenser 13. The coil 12 may be formed directly by the deflecting coil or coils of the cathode ray tube, and condenser 13 may be formed, for instance, by the distributed capacity of the coil. The anode of the tube is energized by a source of potential 14. Joined in parallel with the oscillating circuit 11 is a rectifier 15 and a direct current potential source 16. A coil 17 is coupled inductively with the oscillation circuit and one end of the coil is maintained at cathode potential of the tube 10, while its other end is joined through a source of potential 18 to a control grid of the tube 10. This control grid is joined to the cathode, either directly or by grounding, as illustrated in the figure, through a resistance 19.

The operation of the circuit is as follows:—Disregarding for the time being coil 17 and potential source 18, while tube 10 is conducting, current will flow through rectifier 15 and coil 12 is thus connected with the potential source 16. Accordingly, the current in coil 12 will rise with a slope that is determined by the time constant of the coil. As soon, however, as control grid of tube 10 is energized with a potential impulse which interrupts the current flow through the tube, rectifier 15 is closed to the current flow and the coil 12 executes a free half oscillation. This free half oscillation is stopped later by the opening of rectifier 15 due to the change of potential at the terminals of coil 12. When rectifier 15 opens, the potential source 16 is again connected to the coil with the result that the current course is again determined by the time constant of the coil. Later on tube 10 is again opened so that rectifier 15 is maintained conducting until the next potential impulse is applied to the control grid of tube 10 blocking the tube. These phenomena are explained in detail in my previously mentioned application S. N. 61,499 filed January 30, 1936 entitled "Oscillation producing system".

Now according to my invention, the potential of the screen grid of tube 10 is so adjusted that with the attainment of the maximum value of the saw-tooth current, the tube has reached the beginning of the slightly sloped part of the $i_a$—$e_g$ characteristic. When this point is reached, there results a decrease in the potential of coil 17 according to well known electrical phenomena.

Coil 17 should have such polarity that during the generation of the long side of the saw-tooth current wave, the lower end of the coil is maintained at a positive potential with respect to ground, remaining constant, due to the constant inclination of the saw-tooth side, until towards the end of the duration of the side of the wave. This potential is compensated by potential source 18 so that the control grid of tube 10 is at cathode potential until very near the finish of the generation of the rising side of the curve. As soon as, however, the current rise reduces its inclination the potential in coil 17 decreases and the potential of the control grid on tube 10 begins to be biased negatively. This results in the decrease of the plate current of tube 10 and the current change in coil 12 occasioned thereby causes a further reduction of the control grid potential. This relation between the decrease of the steepness of the current change in coil 12 and the control grid potential which in turn influences the current change as the result that tube 10 is blocked and coil 12 will then execute a free half oscillation.

After completion of the half oscillation, rectifier 15 is rendered conductive due to the potential in coil 12 now reversing itself and the coil current begins to rise again with a slope determined by the time constant of the coil resulting in the impressing of a gradually increasing positive potential on the grid of tube 10 which will make the tube conductive and the long side of the saw-tooth current wave is again generated, and towards the end thereof a return of the coil current begins due to the phenomena previously outlined. The disclosed arrangement is therefore capable of producing this saw-tooth current even without the introduction of the synchronizing potential impulses received from the transmitter.

Figure 2:
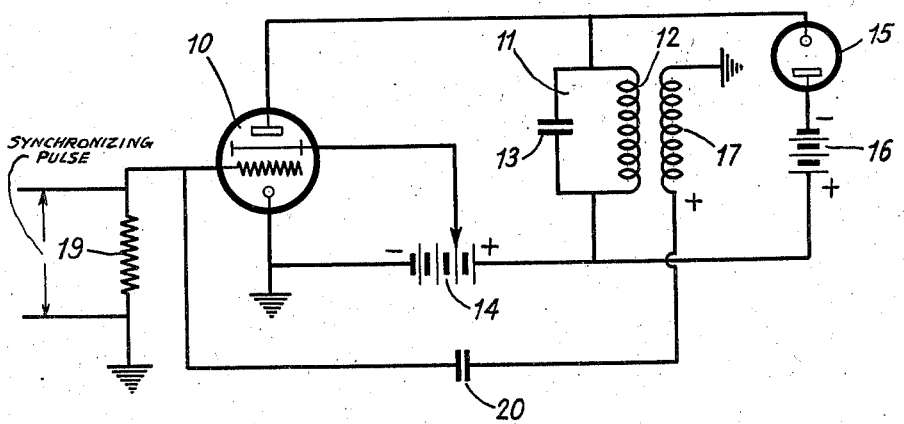
Figure 2 shows a modification of Fig. 1.

Referring to Fig. 2, the potential source 18 may be replaced by a condenser 20 as shown. This is the only difference in the two figures.

What I claim is:—

1. A serrated wave form generator comprising a multigrid vacuum tube having anode, cathode, control and screen electrodes, means for applying synchronizing impulses which are liable to fail to the control grid of said tube, an oscillatory circuit electrically connected between the cathode and the anode of said tube, means for applying a positive potential to said anode with respect to said cathode, means for applying a positive potential to said screen electrode with respect to said cathode, a unidirectional conductor connected in parallel with the oscillatory circuit, and means for feeding back a portion of the oscillatory energy to a control grid of said tube, whereby said generator will continue to produce serrated wave forms upon failure of said synchronization impulses.

2. A serrated wave form generator comprising a multigrid vacuum tube having anode, cathode, control and screen electrodes, means for applying synchronization impulses which are liable to fail to the control grid of said tube, an oscillatory circuit electrically connected between the cathode and the anode of said tube, means for applying a positive potential to said anode with respect to said cathode, means for applying a positive potential to said screen electrode with respect to said cathode, a biased unidirectional conductor connected in parallel with the oscillatory circuit, and means for feeding back a portion of the oscillatory energy to a control grid of said tube, whereby said generator will continue to produce serrated wave forms upon failure of said synchronization impulses.

3. A serrated wave form generator comprising a multigrid vacuum tube having anode, cathode, control and screen electrodes, means for applying synchronization impulses which are liable to fail to the control grid of said tube, an oscillatory circuit electrically connected between the cathode and the anode of said tube, means for applying a positive potential to said anode with respect to said cathode, means for applying a positive potential to said screen electrode with respect to said cathode, a unidirectional conductor connected in parallel with the oscillatory circuit, and inductive means for feeding back a portion of the oscillatory energy to a control grid of said tube, whereby said generator will continue to produce serrated wave forms upon failure of said synchronization impulses.

4. A serrated wave form generator comprising a multigrid vacuum tube having anode, cathode, control and screen electrodes, means for applying synchronization impulses which are liable to fail to the control grid of said tube, an oscillatory circuit electrically connected between the cathode and the anode of said tube, means for applying a positive potential to said anode with respect to said cathode, means for applying a positive potential to said screen electrode with respect to said cathode, a unidirectional conductor connected in parallel with the oscillatory circuit, inductive means coupled to said oscillatory circuit for feeding back a portion of the oscillatory energy to a control grid of the tube, and means for maintaining one terminal of said inductive means at a potential differing from that of the other terminal of said inductive means, whereby said generator will continue to produce serrated wave forms upon failure of said synchronization impulses.

ROBERT ANDRIEU.